No. 12,070. REISSUED JAN. 6, 1903.

H. BORSCH.

NOSE GUARD FOR EYEGLASSES.

APPLICATION FILED NOV. 10, 1902.

Witnesses

Jno. Moore

J. Stewart Rice

Inventor

Henry Borsch

By Thos. E. Robertson

Attorney

UNITED STATES PATENT OFFICE.

HENRY BORSCH, OF CHICAGO, ILLINOIS.

NOSE-GUARD FOR EYEGLASSES.

SPECIFICATION forming part of Reissued Letters Patent No. 12,070, dated January 6, 1903.

Original No. 710,419, dated October 7, 1902. Application for reissue filed November 10, 1902. Serial No. 130,818.

*To all whom it may concern:*

Be it known that I, HENRY BORSCH, a citizen of the United States of America, and a resident of Chicago, in the county of Cook and State of Illinois, have invented certain new and useful Improvements in Nose-Guards for Eyeglasses, of which the following is a specification.

This invention relates to certain new and useful improvements in duplex nose-guards for eyeglasses of that type shown in my application filed February 15, 1902, Serial No. 94,276, which consists of a substantially rigid guard with which coacts a supplemental guard which can move freely with relation to the fixed guard, so as to accommodate itself to various peculiarities of shapes of noses.

The object of this invention is to provide a nose-guard in which the supplemental guard is swiveled on a pivotal pin projecting preferably substantially in line with the fixed guard, and so that the supplemental guard shall have universal movement with respect to the fixed guard. In the preferable embodiment of my invention I accomplish this by providing a supporting or pivotal pin which has a slight bend therein and provide a movable guard with an opening so formed as to move on the bent pin in line with the bend and also on a center of which the axis of the pin is the center.

With this general statement in view my invention consists of a nose-guard having the peculiarities of construction as will be hereinafter described and then definitely pointed out in the appended claims.

Figure 1:
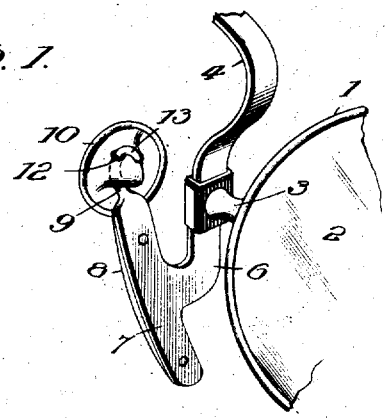
Figure 2:
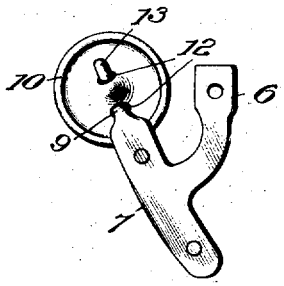
Figure 3:
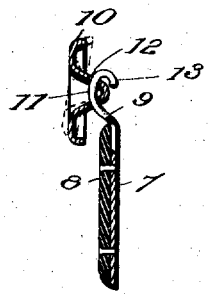
Figure 4:
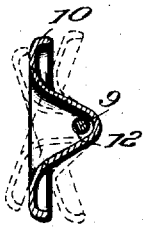

In the accompanying drawings, which form a part of this application, Figure 1 is a perspective view of part of a pair of eyeglasses with one of my improved nose-guards applied thereto. Fig. 2 is an elevation of the nose-guard detached. Fig. 3 is a sectional detail. Fig. 4 is a detail of the movable guard, taken at right angles to that shown in Fig. 3, so as to show the movement of the movable guard about the pivotal pin in line with the axis of the latter.

Referring now to the details of the drawings, which, it will be understood, show what I consider the preferable though not necessary embodiment of my invention, 1 indicates part of the frame of a pair of eyeglasses, and 2 the lens thereof, and to the frame 1 is secured the usual post 3, to which the bridge 4, of any construction, may be secured by an ordinary screw. (Not shown.) Within the loop of the post 3 is also secured the nose-guard, which, as I have illustrated it, consists of the usual securing-arm 6 and the ordinary rigid guard 7, to which may be attached a facing 8 in any desired manner.

All of the parts so far described are of well-known construction, and therefore need no further description.

The metal forming the rigid guard may project therefrom preferably substantially in line with the length of the rigid guard, as seen in Fig. 3, and is formed into a pivotal pin 9, on which is supported the supplemental or movable guard 10. The pivotal pin 9 is provided with a decided bend 11 therein at the point where the pivotal pin passes through two openings 12 in the movable guard, and this bend is of such curvature as to allow the movable guard to move freely thereon as though it were moving in a circle, of which the bend 11 is a part. To prevent the guard from moving off of the pivotal pin, I provide the latter with a second bend or an enlargement 13. The two openings 12, through which the pivotal pin 9 passes, are slightly larger than the diameter of the pin, and this permits of a movement on the pin on an axis of which the pin itself is the center, as shown in Fig. 4. Between the two movements there is practically a universal movement of the movable guard on the pivotal pin, which makes it possible for the movable guard to automatically conform to any irregularity in the shape of the nose to which the fixed guard cannot conform.

I do not limit my claims to the special construction shown in the drawings, as changes may be made in the structure without departing from my invention.

Notwithstanding the fact that in one of my claims I have defined the pivotal pin as passing through perforations in the movable guard, this is not absolutely essential, as the desired object can be accomplished in other ways. At the same time I am fully aware that a duplex nose-guard having one fixed and one movable guard is not new, and therefore do not claim such broadly.

What I claim as new is—

1. A duplex nose-guard for eyeglasses comprising one nose-guard supported substantially rigid with respect to the eyeglass-frame, a pivotal pin projecting from said rigid nose-guard, and a movable guard supported directly on said pivotal pin and having a compound or universal movement thereon, substantially as described.

2. A duplex guard for eyeglasses comprising one nose-guard supported substantially rigid with respect to the eyeglass-frame and having a pivotal pin projecting upwardly therefrom and having a bend therein, and a longitudinally-movable guard swiveled on said bend, substantially as described.

3. A duplex guard for eyeglasses comprising one nose-guard supported substantially rigid with respect to the eyeglass-frame and having a pivotal pin projecting therefrom and having a bend therein, and a movable guard having an opening therein through which the bent pin passes, substantially as described.

4. A duplex guard for eyeglasses comprising one nose-guard supported substantially rigid with respect to the eyeglass-frame and having a pivotal pin projecting therefrom and having a bend therein, and a movable guard having perforations therein through which the bent part of the pivotal pin passes whereby the movable guard has a compound or universal movement on said bent pivotal pin, substantially as described.

5. A duplex nose-guard for eyeglasses comprising one nose-guard supported substantially rigid with respect to the eyeglass-frame, a pivotal pin projecting from said rigid nose-guard substantially in line therewith, and a movable guard supported directly on said pivotal pin and having a compound or universal movement thereon, substantially as described.

6. A duplex nose-guard for eyeglasses comprising one nose-guard supported substantially rigid with respect to the eyeglass-frame and having a curved pivotal pin projecting therefrom, and a longitudinally-movable guard swiveled on the curve of said pivotal pin, substantially as described.

Signed by me at Chicago, Illinois, this 8th day of November, 1902.

HENRY BORSCH.

Witnesses:

P. Z. McDONALD,

C. A. JENSEN.